United States Patent [19]

Dominguez-Ahedo et al.

[11] 4,370,162

[45] Jan. 25, 1983

[54] METHOD FOR THE GASEOUS REDUCTION OF IRON ORE TO SPONGE IRON

[75] Inventors: Carlos Dominguez-Ahedo; Carlos Guzman-Bofill, both of Garza Garcia, Mexico

[73] Assignee: Hylsa, S.A., Monterrey, Mexico

[21] Appl. No.: 246,076

[22] Filed: Mar. 20, 1981

Related U.S. Application Data

[63] Continuation-in-part of Ser. No. 191,941, Sep. 29, 1980.

[51] Int. Cl.³ .............................................. C21B 13/02
[52] U.S. Cl. ....................................... 75/90 R; 75/35; 75/91; 266/140; 266/156
[58] Field of Search ..................... 75/34, 90 R, 35, 91; 266/155, 156, 140

[56] References Cited

U.S. PATENT DOCUMENTS

| | | | |
|---|---|---|---|
| 3,282,677 | 11/1966 | Futakuchi et al. | 75/35 |
| 3,909,244 | 9/1975 | Rose et al. | 75/35 |
| 4,019,724 | 4/1977 | Cruse, Jr. et al. | 75/35 |
| 4,040,816 | 8/1977 | Altenhoner et al. | 75/35 |
| 4,047,935 | 9/1977 | Barnhart | 75/35 |

*Primary Examiner*—M J. Andrews
*Attorney, Agent, or Firm*—Curtis, Morris & Safford

[57] ABSTRACT

Process and apparatus for the gaseous direct reduction of iron ores wherein at least a portion of the spent reducing gas effluent from a reduction reactor is upgraded and thereafter heated and recycled to said reactor forming a reducing gas loop and make-up reducing gas is added to said loop. The hot products of combustion, i.e., flue gases, in the reformer are used to heat the recycled gas (and optionally the quenched make-up gas) while maintaining independent control of the operating conditions of the reformer and gas heater to give improved thermal efficiency and fuel savings. The reformer has a stand-by stack through which the reformer flue gas is directed when the gas heater is shut down (to permit independent continuous operation of the reformer).

5 Claims, 2 Drawing Figures

METHOD FOR THE GASEOUS REDUCTION OF IRON ORE TO SPONGE IRON

This application is a continuation-in-part of application Ser. No. 191,941, filed Sept. 29, 1980.

FIELD OF INVENTION

The present invention relates to the gaseous direct reduction of metal ores of the type in which particulate ores are treated with a hot reducing gas largely composed of hydrogen and carbon monoxide, and is especially useful in the production of sponge iron.

The reducing gas may be produced by the catalytic reformation of light hydrocarbons or the like by steam or carbon dioxide, by partial combustion of fuels with oxygen, and by other ways known in the art. More particularly, this invention is directed to an improved method and apparatus for reducing metal ores using a catalytic reformer where at least a portion of the reacted reducing gas effluent from the reduction zone of a moving bed reactor is upgraded and recycled to said reduction zone, said recycled gas stream being heated before its re-introduction to said reduction zone.

BACKGROUND OF THE INVENTION

U.S. Pat. Nos. 3,765,872; 3,779,741; and 4,224,057 are exemplary of the type of direct reduction moving bed processes for which the present invention is especially useful.

With the recent dramatic increase in fuel costs, the viability of a commercial process can be seriously jeopardized if it is not fuel efficient. Since catalytic reformers used in direct reduction processes must operate at high temperatures for proper continued function and for producing reducing gas with the proper constituents; such reformers, without any heat recovery, can operate only at about 50% maximum thermal efficiency.

The reformation reaction of light hydrocarbons and naphthas takes place in catalytic-packed tubes at temperatures ranging from 600° to 900° C. The catalyst tubes are typically located in a radiant chamber where they are fire heated. The flue gases produced leave the chamber typically at a high temperature of around 1000° C.

In order to increase the overall efficiency of the reformer, it has been the practice in the past to recover as much of the thermal energy of these flue gases as possible, for example by using heat exchangers to preheat the natural gas-steam reformer feed mixture, to generate the steam necessary for said reaction, and to preheat the combustion air used in the burners of said reformers. By these means it is possible to increase the overall thermal efficiency of the reformers to a range of from 80% to a maximum of 90 or 91%. However, in so increasing the thermal efficiency of the reformer, some of the steam produced is in excess of that required for the reduction process. This is termed "export" steam. This export steam can be used to drive turbines to generate mechanical or electrical energy (for example, for use in driving pumps, compressor motors, and the like). But in many installations, because of the availability of other more cost-effective energy sources, the use of the excess heat from the reformer to produce export steam is undesirable.

It is also a feature of these catalytic reformers that they are very sensitive to thermal shock and should be run at a steady state. For example, start-up of a reformer typically takes about one to three days. As a consequence, it is most desirable that the reformer need not be shut down during short-term processing interruptions.

The other major source of energy consumption in these processes is the heater used to raise the temperature of the de-watered make-up reducing gas and/or recycled reducing gas to a level adequate for the reduction of the ore, namely from 700° to 1100° C., and preferably between 870° and 950° C. Typically the exit temperature of the flue gas from this separate heater is normally kept in the range of 140° C. to 200° C., and preferably about 160° C. The operating conditions of the heater depend upon the particular operating conditions at the reactor which may vary, for example, due to change in productivity or in the type of iron ore charged.

It is an object of the present invention to provide a method and apparatus for reducing metal ores to metal particles with less fuel overall than was formerly required.

It is a further object of the present invention to provide such method and apparatus with an improved overall thermal efficiency.

It is a still further object of the present invention to achieve the foregoing objects in a more efficient and economical manner than was heretofore possible by the former processes.

It is yet a further object of the present invention to provide a method and apparatus which affords greater flexibility in overall plant design and operation.

Other objects and advantages of this invention will become clear from the following description of the invention and its preferred embodiments.

SUMMARY OF THE INVENTION

Where in the past it had been thought necessary to separate the functions of the reformer and the heater, the applicants have discovered that these may be combined to a degree in order to realize improved thermal efficiencies and fuel savings and yet achieve the flexibility of independent operation necessary to maintain the steady operation of the reformer while permitting variation in operation of the heater in response to the changing demands of the reactor (including shut-down).

This surprising partial integration of the reformer and the heater has been achieved by feeding the flue gases of the reformer (typically at about 650° C. to 700° C.) into the heater. This reduces the fuel requirements of the heater by an amount equal to the heat content in the reformer's flue gases. An independent burner in the heater is responsive to the reactor's demands and supplies the balance of the energy required to heat the reducing gases fed to the reactor. Since the heater's burner is independent of the reformer's burner, the heater can be shut down and the reformer flue gases diverted from the heater to vent through a separate stack situated upstream of the heater. This permits continued operation of the reformer during actual shut-down of the heater.

This integration of the reforming furnace and the heating furnace gives an improved overall thermal efficiency which would be of the order of about 93%. Even more significantly, is the reduction in heat content per unit time required to fuel the integrated furnaces as opposed to the separate furnaces, giving an estimated fuel saving of approximately 13%.

In this specification and the accompanying drawings, we have shown and described preferred embodiments of our invention and have suggested various alternatives and modifications thereof; but it is to be understood that these are not intended to be exhaustive and that many other changes and modifications can be made within the scope of the invention. These suggestions herein are selected and included for purposes of illustration in order that others skilled in the art will more fully understand the invention and the principles thereof and will thus be enabled to modify it and embody it in a variety of forms, each as may be best suited to the conditions of a particular use.

One such modification and embodiment is directed to a process flow scheme incorporating a second independently controlled heating unit designed to cooperate with the integrated heater and reformer system generally described above. This second heating unit can be designed as a functionally separate heat source with a heat output selected to effectively supplement the heat generated in the integrated heater and reformer system. In this way the capital cost of the overall system can still be significantly reduced while maintaining process efficiency and providing improved flexibility and back-up reliability. Additionally, a coordinated process design utilizing such a second independently controlled heater is of significant importance when upgrading a conventional fixed or moving bed direct reduction plant already operating with a separate reformer and heater, by retaining the separate heater and replacing the conventional reformer with an increased capacity integrated heating and reforming unit as described herein.

DETAILED DESCRIPTION OF THE DRAWING

Although the following description specifically relates to the reduction of iron ores to sponge iron, it should be evident to those skilled in the art that the direct gaseous reduction system may also be applied to the reduction of metal ores other than iron ore.

Figure 1:
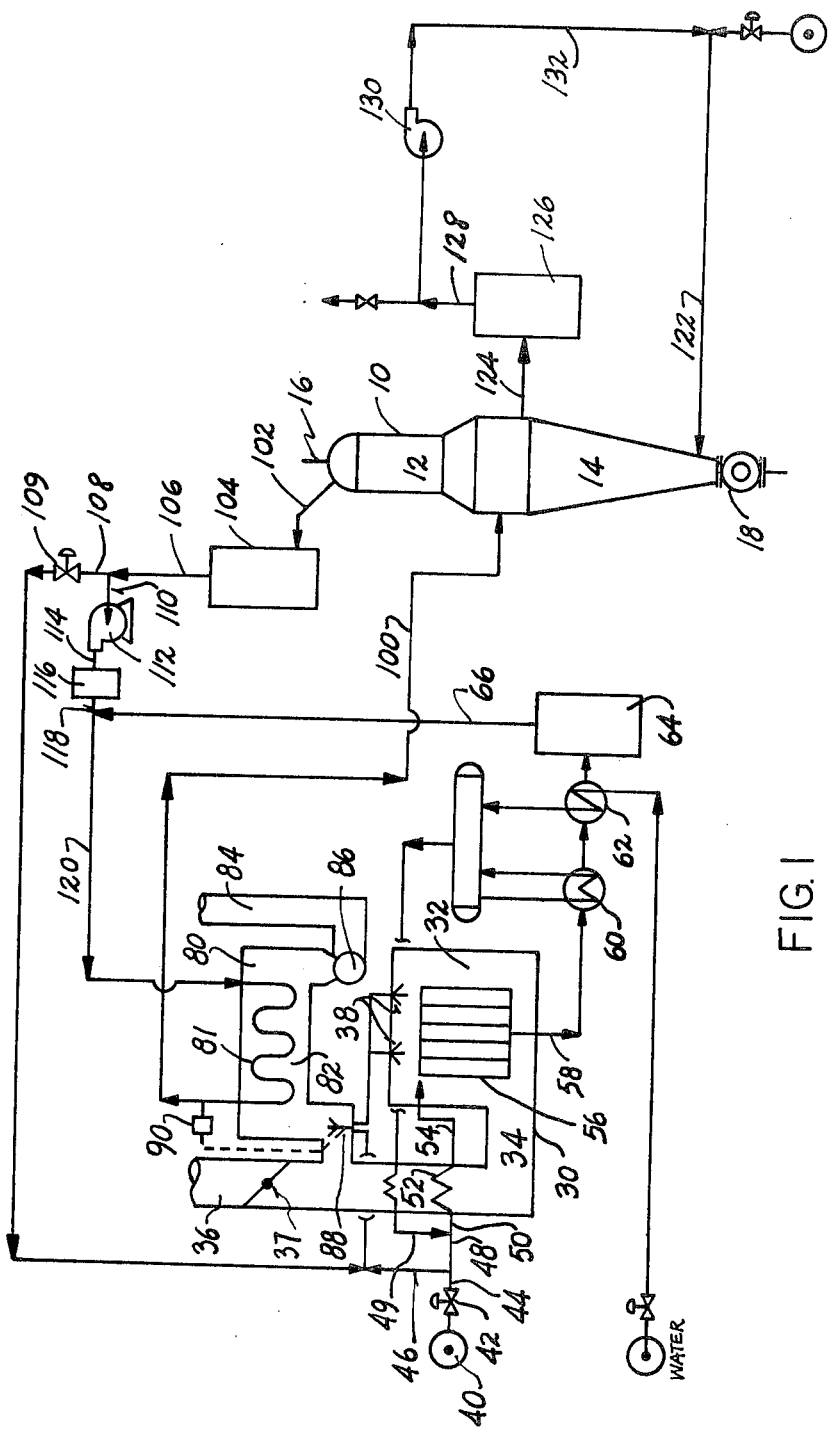
FIG. 1 illustrates the basic flow scheme for the method of the present invention using an integrated heating and reforming unit according to a preferred embodiment of the present invention.

Referring to the FIG. 1, the numeral 10 generally designates a vertical shaft, moving bed reduction reactor having a reduction zone 12 in the upper portion thereof and a cooling zone 14 in the lower portion of the reactor. Iron ore to be reduced enters the top of the reactor through an inlet 16 and flows downwardly through the reduction zone 12 wherein it is reduced by upwardly flowing hot reducing gas. The reduced iron ore then flows downwardly through the cooling zone 14 and out of the reactor through the discharge 18.

Reduction of the iron ore is effected by means of a reducing gas composed largely of carbon monoxide and hydrogen which is produced in a reforming unit 30. Natural gas from a source 40 flows through flow controller 42 and pipe 44 and is then divided with one portion flowing through pipe 46 to a point of use, e.g., as a fuel gas, with the remainder of the natural gas flowing through pipe 48 in which it is mixed with steam from pipe 49. The mixture of natural gas and steam flows through pipe 50 and is preheated in heating tubes 52 after which the heated mixture flows through pipe 54 into catalyst-packed tubes 56 wherein the natural gas and steam are reformed to produce a reducing gas composed largely of hydrogen and carbon monoxide. The hot reducing gas exits catalyst-packed tubes 56 through pipe 58 at a temperature in the range of 700° to 1000° C. The mixture of natural gas and steam can be reformed in the reforming unit 30 in accordance with the following reaction:

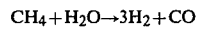

$$CH_4 + H_2O \rightarrow 3H_2 + CO$$

The reforming unit 30 is designed such that its operation can be controllably integrated with that of the heating unit 80. Specifically, the reforming unit 30 has a radiant chamber 32 containing catalyst-packed tubes 56, a first convective chamber 34 and a flue stack 36. Heat is supplied to the reforming unit 30 via burners 38. Natural gas is combusted in reforming unit 30 with the products of combustion in the first convective chamber 34 having a temperature in the range of 800° C. to 1200° C. The products of combustion, or flue gas, flow through convective chamber 34 and past heating tubes 52 to the inlet of heating unit 80. The flue gas temperature at the inlet to heating unit 80 is in the range of about 500° to 1000° C., preferably 650° C. to 700° C. Heating unit 80 contains a second convective chamber 82 communicating with a flue stack 84 through an induced draft fan 86. Flue stack 36 serves to vent hot flue gases from reforming unit 30 to the atmosphere, by-passing heating unit 80. When heating unit 80 is shut down, damper 37 is positioned so that hot flue gases are diverted and vented through stack 36 maintaining the steady state operation of reforming unit 30.

The reducing gas flowing through pipe 58 containing about 20 to 25% by volume of water, is passed through waste heat boiler 60, heat exchanger 62 and quench cooler 64 wherein the water in the reducing gas is condensed. The relatively dry, i.e., approximately 1% of water, and cooled reducing gas flows through pipe 66 and is combined with reactor gas effluent from the reduction zone of the reactor 10.

Turning now to the reactor 10, as stated above, reduction of the ore is effected by means of a reducing gas composed largely of carbon monoxide and hydrogen which is heated in heating unit 80 to a temperature in the range of about 750° to 1000° C. and then flows through pipe 100 to reactor 10. After injection into the reactor, the hot reducing gas flows upwardly through the particulate iron ore in the reduction zone 12 to reduce the ore to sponge iron. Gas leaving the top of the ore bed in the reduction zone 12 leaves the reactor through pipe 102 and flows through quench cooler 104 wherein it is cooled and de-watered by direct contact with cooling water.

The cooled and de-watered reducing gas leaves cooler 104 through pipe 106 and is then divided with one portion flowing through pipe 108 to a suitable point of storage or a point of use, e.g., as a fuel gas. The remainder of the reducing gas flowing through pipe 106 passes through pipe 110 to a pump 112 by which it is pumped through pipe 114 and into CO$_2$ removal unit 116 to remove CO$_2$ from the reactor effluent. The upgraded reducing gas then flows through pipe 118 to a point of mixing with the make-up reducing gas flowing through pipe 66 from reforming unit 30.

The mixture of reactor effluent and make-up reducing gas flows through pipe 120 to a heating unit 80 wherein it is heated in heating tubes 81 located in convection chamber 82. Heat is supplied to heating unit 80 by burners 88 regulated by controller 90. Thus a substantial proportion of the reducing gas flows in a reducing loop comprising the reduction zone 12, pipe 102, cooler 104, pipes 106 and 110, pump 112, pipe 114, $CO_2$ removal unit 116, pipes 118 and 120, heating unit 80 and pipe 100. To this loop is added make-up reducing gas through pipe 66 from reforming unit 30 which combines with the reactor effluent in pipe 118 to flow through pipe 120 to heating unit 80. As shown in the drawing, pipe 108 is provided with a back pressure regulator 109 for maintaining a desired elevated pressure within the reactor.

The cooling zone 14, like the reduction zone 12, also forms part of a gas flow loop. Cooling gas enters the bottom of the cooling zone through pipe 122 and flows upwardly through cooling zone 14 to a point of exit through pipe 124 to cooler 126 wherein it is cooled and de-watered and thence removed through pipe 128 to circulating pump 130 by which it is pumped through pipe 132 back to pipe 122.

Figure 2:
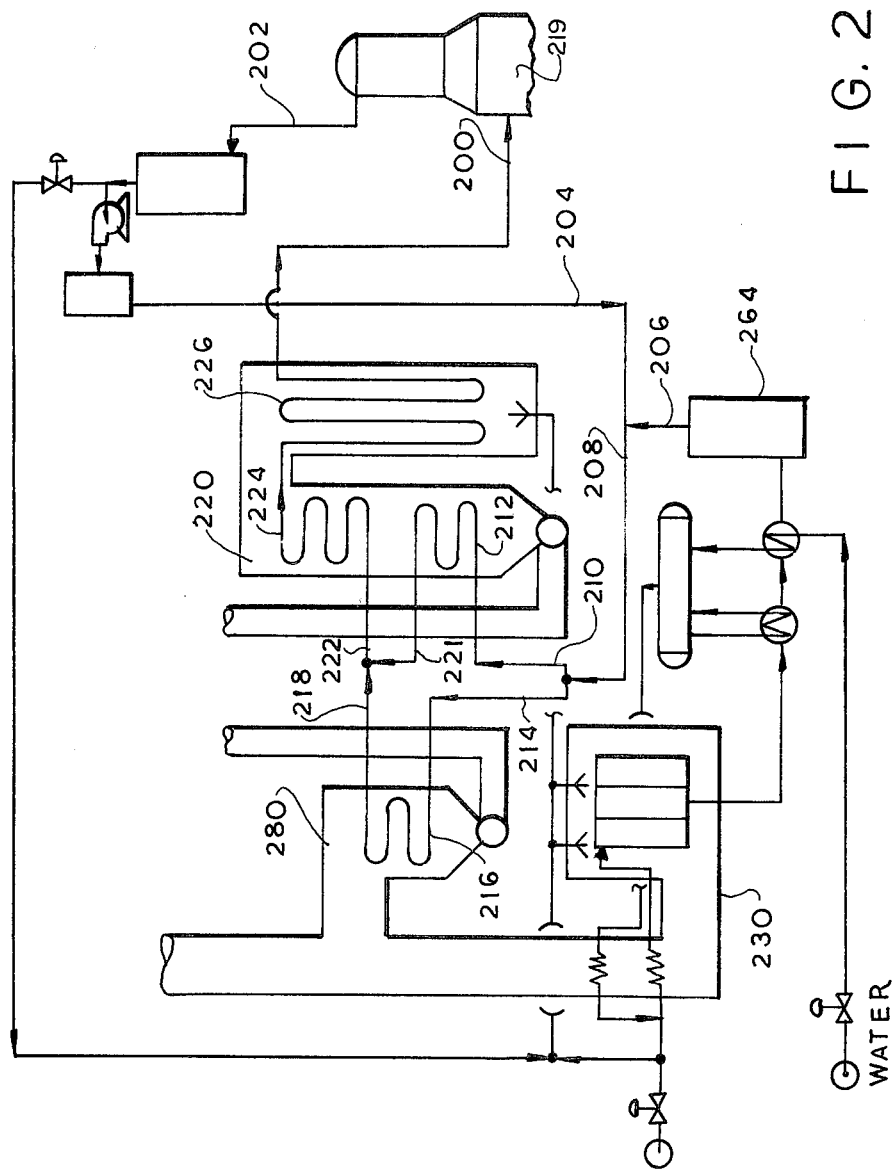
FIG. 2 illustrates an alternative embodiment directed to the use of a supplemental heater in accordance with an integrated heating and reforming unit as described in FIG. 1.

Turning now to the embodiment illustrated in FIG. 2, it should be noted that since the basic reduction process is similar to that described in FIG. 1, the detailed description which follows shall be limited primarily to the substantial differences between the respective embodiments. It should be further understood that equipment shown in FIG. 2 but not described herein is similar or identical to the corresponding equipment shown and described in FIG. 1.

Reduction of the iron ore is effected by means of a reducing gas composed largely of carbon monoxide and hydrogen produced in a reforming unit as described for the process scheme shown in FIG. 1. Hot reducing gas is injected through pipe 200 into the reactor and flows upwardly through the particulate iron ore in the reduction zone 219 to effect reduction of the ore to sponge iron. The gas from the top of the ore bed in the reduction zone 219 leaves the reactor through pipe 202 and flows through a quench cooler and $CO_2$ removal unit, if necessary, as described in FIG. 1. The reducing gas exiting the quench cooler, $CO_2$ removal unit and associated equipment flows through pipe 204 to combine with fresh make-up reducing gas reformed in reforming unit 230 and flowing from quench cooler 264 into and through pipe 206 to form a combined gas stream in pipe 208. A portion of the gas flowing through pipe 208 flows into and through pipe 210 and through heating tubes 212 located in heating unit 220. The remaining portion of gas flowing through pipe 208 flows into and through pipe 214 for injection into heating tubes 216 located in heating unit 280 (designed to coordinate with said reforming unit 230, similar to the integrated system illustrated in FIG. 1).

The gas flowing through heating unit 280 is heated therein and exits through pipe 218. Similarly, the gas flowing through heating tubes 212 is heated and exits heating unit 220 through pipe 221. The heated gases flowing through pipes 218 and 221 are combined and injected into heating unit 220 and through pipe 222 and are controllably heated in heating tubes 224 and 226. The combined gas stream exits heating unit 220 through pipe 200 and is recycled to the reactor through pipe 200.

The relative amounts of heat supplied in heating units 220 and 280 to the respective gas streams flowing therethrough can be controllably varied. Depending upon various process conditions, it may be desirable to minimize the heat requirement in supplemental heating unit 220 or it may be advantageous to reduce the amount of heat supplied in heating unit 280. Regardless of the amount of heat supplied by either heating unit the temperature of the reducing gas recycled to the reactor through pipe 200 should be in the range of about 750° C. to 1000° C.

What is claimed is:

1. A method for reducing particulate metal ore to sponge metal in a vertical shaft, moving bed reactor having a reduction zone for reducing said particulate metal ore in which a hot reducing gas largely composed of carbon monoxide and hydrogen is caused to flow through said reduction zone to reduce the metal ore therein to metal, which comprises the steps of withdrawing substantially all of the reducing gas from the reactor as an effluent gas, removing water from the effluent gas, feeding a portion of said effluent gas to a first heating unit to heat said gas and feeding the remaining portion of said effluent gas to a second heating unit, recycling at least a portion of said effluent gas to said reactor to form a reducing gas loop, reforming a hydrocarbon-containing gas in a catalytic reformer at an elevated temperature to produce make-up reducing gas fed to said loop and burning a suitable fuel to produce hot combustion products for heating said gas in said reformer, said second heating unit being integrated with the reformer to enable the hot combustion products produced in said reformer to be passed in heat exchange relationship with the effluent gas fed to said second heating unit, combining the heated effluent gas from the first and second heating units and feeding said combined gas stream to said first heating unit to reheat said gas stream further prior to being recycled to the reduction zone of the reactor.

2. The method of claim 1 wherein make-up reducing gas is added to said cooled effluent gas stream.

3. The method of claim 1 which further comprises removing carbon dioxide present in said effluent gas stream.

4. The method of claim 1 wherein water is removed by cooling said second gas stream.

5. The method of claim 1 wherein said hydrocarbon containing gas is natural gas.

* * * * *

UNITED STATES PATENT AND TRADEMARK OFFICE
CERTIFICATE OF CORRECTION

PATENT NO. : 4,370,162
DATED : Jan. 25, 1983
INVENTOR(S) : Carlos Dominguez-Ahedo, et al.

It is certified that error appears in the above—identified patent and that said Letters Patent is hereby corrected as shown below:

Column 6, line 55 (claim 4, line 2) replace "second" by --effluent--.

Signed and Sealed this

Twenty-ninth Day of March 1983

[SEAL]

Attest:

GERALD J. MOSSINGHOFF

Attesting Officer    Commissioner of Patents and Trademarks